Patented Sept. 23, 1930

1,776,595

UNITED STATES PATENT OFFICE

SVEN GUNNAR NORDENGREN, OF LANDSKRONA, SWEDEN, ASSIGNOR TO AKTIEBOLAGET KEMISKA PATENTER, OF LANDSKRONA, SWEDEN, A JOINT-STOCK COMPANY, OF SWEDEN

MANUFACTURE OF PHOSPHORIC ACID

No Drawing. Application filed April 12, 1929, Serial No. 354,698, and in Germany July 7, 1928.

In the manufacture of phosphoric acid from phosphate rock and sulphuric acid the nature of the calcium sulphate formed in the course of the reaction is of considerable importance for the successful operation of the process. It has been found that a precipitate which is easy to handle and separate can be obtained if the process is conducted in such a manner that the calcium sulphate formed in the course of the reaction is deposited substantially as $CaSO_4$ with $½H_2O$ ($CaSO_4.½H_2O$) or less or as anhydrite or as mixtures of $CaSO_4$ with $½H_2O$ or less and anhydrite.

It has been shown, e. g. in the article "Gips und Anhydrit" by J. H. van't Hoff and others (Zeitschrift für physikalische Chemie, XLV, 1903, p. 257) that the crystallization of calcium sulphate with varying amounts of water, for example as $CaSO_4.2H_2O$, $CaSO_4.1½H_2O$, $CaSO_4.H_2O$, $CaSO_4.½H_2O$ and as soluble and insoluble anhydrite, or the conversion of calcium sulphate into these forms, is intimately connected with the vapour pressure of the water of crystallization. If, for example, a saturated sodium chloride solution is mixed with $CaSO_4.2H_2O$ and heated, conversion to $CaSO_4.½H_2O$ takes place at a temperature of about 76° C. In other words, at this temperature the vapour pressure of the water of crystallization of $CaSO_4.2H_2O$ is greater than that of the saturated sodium chloride solution and thus conversion occurs. It follows, therefore, that if the calcium sulphate resulting from the reaction between the phosphate and the sulphuric acid is to have a water content which equals or is less than that of $CaSO_4.½H_2O$ the vapour tension, at least for a certain period of time, should not exceed a certain limit, which limit in its turn depends on the temperature. In actual practice a sufficiently low vapour pressure is therefore maintained by regulating the composition, concentration, temperature and pressure of the reaction mixture to obtain calcium sulphate in the form or forms described.

In order to find out in which form calcium sulphate is obtained when manufacturing phosphoric acid by any of the processes heretofore used, tests were carried out, in which the quantities and the composition of the reacting bodies and the temperature and the time of the reaction were chosen so as to conform exactly with those of the continuous counter current decantation process. The molecular ratio of the sulphuric acid to the water in the tests was 0.053 mol. $H_2SO_4$ to 1 mol. $H_2O$ and the temperature was kept at 70° C. After completing the reaction the calcium sulphate precipitated, as shown by analysis, was found to contain 20.80% water of crystallization. As $CaSO_4.2H_2O$ contains 20.9% water of crystallization it is evident that substantially this body had been formed.

Experiments have also been carried out in order to ascertain in what way sulphuric and phosphoric acid of different concentrations and at different temperatures affect the percentage of water of crystallization in calcium sulphate. $CaSO_4.2H_2O$ corresponds to a percentage of water of crystallization of 20.9 and $CaSO_4.½H_2O$ to a percentage of 6.2%. The tests were carried out by mixing each of these two bodies, after determining their respective contents of water of crystallization, with the said acids at different temperatures and concentrations, and the changes in the percentage of water of crystallization were then estimated after washing with alcohol and subsequent drying by calcination.

In this way it was found that a fairly concentrated sulphuric acid (from 50 per cent and upwards) rapidly removes the greater part of the water of crystallization in respect of $CaSO_4.2H_2O$ as well as $CaSO_4.½H_2O$, and this occurs already at ordinary temperatures. The water of crystallization is removed even more rapidly at a temperature of 100° C., when a concentration of sulphuric acid of only 27 per cent approximately suffices to effect a considerable degree of dehydration. On the other hand, when using phosphoric acid for the tests a higher concentration and a higher temperature were required. If $CaSO_4.½H_2O$ was treated for four hours with a 27 per cent phosphoric acid the percentage of water of crystallization obtained at ordinary temperatures was 19, which is in substantial agreement with the formulæ

$CaSO_4.2H_2O$, but at a temperature of 100° C., the percentage of water was 4.38, which shows that the calcium sulphate had partly been converted into even a lower stage of hydration than $CaSO_4.\frac{1}{2}H_2O$.

If now calcium phosphate is decomposed with sulphuric acid of a certain strength the concentration of the acid rapidly decreases; at the same time, however, the concentration of the phosphoric acid formed increases. Thus the calcium sulphate is acted upon not only by the sulphuric acid but also, and to a greater extent, by the phosphoric acid. The strength of the latter is, of course, determined by the concentration of the initial sulphuric acid. It has now been found that the molecular ratio of $H_2SO_4$ to $H_2O$ in the charge at the beginning of the reaction should exceed 0.10 mol. $H_2SO_4$ to 1 mol. $H_2O$. If this is the case and if the temperature is a suitable one calcium sulphate is formed having a percentage of water of crystallization which corresponds to $CaSO_4$ with $\frac{1}{2}H_2O$ or less or anhydrite or mixtures thereof, and the precipitate of calcium sulphate will be easily separable from the phosphoric acid solution. The aforesaid value relating to the concentration of the sulphuric acid represents a lower limit which in practice should preferably be exceeded. Tests have shown that concentrations of about 0.12–0.15 mol. $H_2SO_4$ to one mol. $H_2O$ are suitable.

Even at the lowest concentration referred to above of 0.10 mol. $H_2SO_4$ to one mol. $H_2O$ the concentration of the sulphuric acid is higher than in any of the processes hitherto known. In these earlier processes it was desirable to use a particularly low concentration of sulphuric acid in order to avoid dissolving out too much iron or iron compounds and for this reason a sulphuric acid having a concentration of 17 to 25% $H_2SO_4$ was used (Schucht: Die Fabrikation des Superphosphats). Later sulphuric acid has been used having a specific gravity up to 1.265, obtained by dilution of strong sulphuric acid with wash water containing phosphoric acid (Waggaman & Easterwood: Phosphoric acid, Phosphates and Phosphatic Fertilizers 1927). Chemically pure sulphuric acid having a specific gravity of 1.265 corresponds to 35% $H_2SO_4$ or approximately 0.10 mol. $H_2SO_4$ to one mol. $H_2O$, but as allowance must be made for the phosphoric acid and calcium sulphate contained in the wash water the ratio of $H_2SO_4$ to $H_2O$ is in reality much lower than 0.10. In the process known as the continuous counter current decantation 78 per cent sulphuric acid is diluted with wash water having a specific gravity of aproximately 1.125–1.135 and containing approximately 10% $P_2O_5$ until an acid having a specific gravity of 1.230–1.265 is obtained. If the molecular ration of $H_2SO_4$ to $H_2O$ in such a mixture is calculated, it will be found that the concentration is only 0.05 mol. $H_2SO_4$ to one mol. $H_2O$.

As has already been stated tests with sulphuric acid and calcium phosphate have shown that an increase of the temperature had the effect of lowering the percentage of water of crystallization. The temperature required in the manufacture of phosphoric acid from mineral phosphates and sulphuric acid in order to obtain a calcium sulphate precipitate having a content of water of crystallization corresponding to $$CaSO_4.\tfrac{1}{2}H_2O$$

or less depends on the manner in which the decomposition is carried out and the composition of the reacting bodies. The effect of these factors on the temperature is fully described in the co-pending application No. 354,699 filed on even date herewith. The reaction mixture should, however, reach a temperature of at least 80° C. during the process. In actual practice it is preferable to considerably exceed this temperature as otherwise the time required for completing the reaction will be too long. In the processes heretofore used lower temperatures have been employed.

*Example*

700 kilograms disintegrated rock phosphate containing 3.98% moisture and 30.16% $P_2O_5$ on dry substance was mixed with 503 liters sulphuric acid containing 76.37% $H_2SO_4$ and with 220 liters water. The mixture was heated to a temperature not exceeding 137° C. If the acid or the water is heated before mixing the reagents and if the reaction is carried out in an autoclave the heat of the reaction and the heat generated by the dilution of the sulphuric acid is sufficient for attaining the said temperature. After 35 minutes the mass was cooled by injection of air, the phosphoric acid formed was separated from the residue consisting substantially of calcium sulphate and the sulphate was washed with water. The content of water of crystallization in the calcium sulphate was determined and found to be 2.08%; the residue kept several days without solidifying.

A similar result, i. e. a calcium sulphate having a content of water of crystallization of 6.2% corresponding to the formulæ $CaSO_4.\frac{1}{2}H_2O$, or less, can be obtained also at lower temperatures than those specified above, but in that case the time of the reaction should be correspondingly increased.

The present process is, however, not limited to the production of phosphoric acid only but is also particularly suitable for the manufacture of products containing phosphoric acid or products in the manufacture of which phosphoric acid is used. It is thus possible to use the new process in combination with other processes known per se or to add to the reagents ordinarily employed in the process other substances or undertake modifications without departing from the spirit of the invention.

Further, the phosphoric acid or the product containing phosphoric acid produced according to the present invention is particularly suitable for the manufacture of products containing phosphoric acid. As examples of such modifications of the process and the employment of the products directly produced by this process or a modified process may be mentioned the manufacture of double superphosphate produced from such phosphoric acid, or superphosphate to which such phosphoric acid has been added in the manufacture thereof for the purpose of increasing its contents of soluble phosphoric acid, or other phosphates or manures containing phosphoric acid as, for example, ammonium and potassium phosphate, or mixtures of two or more of the said double phosphates, superphosphates or other phosphates or manures with each other or with ordinary superphosphate.

It is evident that the invention is not limited to the use of mineral phosphates or rock phosphates but that any other suitable raw material containing phosphoric acid and calcium may be used.

What I claim as new and desire to secure by Letters Patent of the United States of America is:—

Process of producing phosphoric acid comprising mixing a rock phosphate with sulphuric acid of such strength as to obtain a concentration of $H_2SO_4$ to $H_2O$ in the reaction mixture which exceeds a ratio of 0.6 kg. $H_2SO_4$ to 1 kg. $H_2O$, raising the reaction mixture during the process to a temperature of at least 80° C., depositing the calcium sulphate substantially as $CaSO_4$ with $0-\frac{1}{2}H_2O$ and separating the calcium sulphate in said form from the liquor.

In testimony whereof I affix my signature.

SVEN GUNNAR NORDENGREN.